US006856628B1

(12) United States Patent
Bychowsky et al.

(10) Patent No.: US 6,856,628 B1
(45) Date of Patent: Feb. 15, 2005

(54) METHOD AND APPARATUS FOR TUNNELING PACKETS IN A PACKET DATA SYSTEM

(75) Inventors: Michael W. Bychowsky, Harvard, IL (US); Michael Kloos, Elgin, IL (US); Derek Oxley, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 722 days.

(21) Appl. No.: 09/697,587

(22) Filed: Oct. 26, 2000

(51) Int. Cl.[7] ............................................. H04L 12/56
(52) U.S. Cl. ...................... 370/412; 370/429; 370/468
(58) Field of Search ................................ 370/412, 429, 370/465, 468

(56) References Cited

U.S. PATENT DOCUMENTS

| 4,510,599 | A | * | 4/1985 | Ulug ........................... 370/463 |
| 4,616,359 | A | * | 10/1986 | Fontenot ..................... 370/230 |
| 5,309,432 | A | * | 5/1994 | Kanakia ..................... 370/412 |
| 5,497,371 | A | * | 3/1996 | Ellis et al. .................. 370/412 |
| 5,557,608 | A | * | 9/1996 | Calvignac et al. ........... 370/389 |
| 6,058,111 | A | | 5/2000 | Beyda et al. |
| 6,064,650 | A | * | 5/2000 | Kappler et al. ............. 370/232 |
| 6,064,651 | A | * | 5/2000 | Rogers et al. .............. 370/233 |

FOREIGN PATENT DOCUMENTS

| EP | 0582537 A2 | 2/1994 |
| EP | 0684719 A1 | 11/1995 |

* cited by examiner

*Primary Examiner*—Chau Nguyen
*Assistant Examiner*—Blanche Wong
(74) *Attorney, Agent, or Firm*—Jeffrey K. Jacobs

(57) ABSTRACT

A packet prioritization and transmission algorithm for on demand transportation of data packets having different priorities through a shared packet pipe. The algorithm comprises prematurely ending the transmission of a packet having a low priority; placing the remainder of the packet having the low priority in a storage means, holding data of the packet having the low priority in the storage means, transmitting a packet having a high priority, transmitting the remainder of the packet having the low priority once the packet having the high priority is finished transmitting, flagging a packet header of a packet having the low priority to identify pending packets to allow for transmission of packets having the high priority; and determining a priority of an incoming packet.

15 Claims, 2 Drawing Sheets

100

200

METHOD AND APPARATUS FOR TUNNELING PACKETS IN A PACKET DATA SYSTEM

FIELD OF THE INVENTION

The present invention relates generally to transporting data packets on a shared packet pipe, and more particularly to a method and apparatus of transporting data packets having different priorities through a shared packet pipe on demand while conserving bandwidth.

BACKGROUND OF THE INVENTION

Packets and packet data systems are known and find numerous uses. Packet data systems allow for the transportation of packets to facilitate the transfer of information. For example, packets and packet data systems are used in cellular systems to send voice and data information to cellular phone users. Transporting information in today's world is accomplished by encapsulating specific types of information into packets and sending the packets through a "pipe." A packet is a collection of information (i.e., data, voice, ET3, audio, etc.) The information contained in the package can be a combination of the aforementioned information types. When sending packets through a packet pipe, and more particularly a shared packet pipe, the packets are assigned a priority level. The priority level is assigned primarily based upon the size of the packet and the type of information contained within the packet. Certain packet types are time critical for transmission (full-duplex voice) and cannot be held up by currently transmitting non-time critical packets. When using a network comprising a shared packet pipe to transport information packets, it is common that large low priority packets clog the shared packet pipe leaving high priority packets waiting for the low priority packets to finish. The net result is an unacceptable delay in high priority transmissions.

Several prior art methods were devised to eliminate the clogging problem found in shared packet pipes. For example, preemption was previously included in the frame relay standard. Preemption is a method of stopping packets from traveling through a type of transmission line. For example, preemption occurs where a HDLC (High Level Data Link Control) protocol uses a "kill sequence" to end packet transmission. The "kill sequence" is a special sequence of bits issued by the packet transmission station. Both of these methods, while reducing delay, add to the bandwidth necessary to transport the packets because the transmitter has to retransmit the portion of the packet that was killed. Thus, a more effective method for transporting packets of varying priorities in a shared packet pipe transportation system is needed.

DETAILED DESCRIPTION OF THE PREFERRED EMBODIMENTS

In a network utilizing a shared packet pipe to transport a plurality of types of packets each having a different priority, a method for appending multiple data packets in a shared packet pipe, the method including the steps prematurely ending the transmission of a packet having a low priority, placing the remainder of the packet having the low priority in a storage means, and transmitting a packet having a high priority. The method of appending multiple data packets further includes transmitting the remainder of the packet having the low priority once the packet having the high priority is finished transmitting, flagging a packet header of a packet having the low priority to identify pending packets to allow for transmission of packets having the high priority, determining a priority of an incoming packet, and periodically checking the priority of the data packet being transmitted.

According to one embodiment of the present invention, in a network designed to transport a plurality of types of packets each having a different priority, an apparatus for appending multiple packet types to effect predictable transmission in a shared packet pipe includes a shared packet pipe, a signal transmission means communicatively coupled to the shared packet pipe, a controller connected to the shared packet pipe coupled, and a signal receiving means communicatively to a shared packet pipe. The present invention uses an algorithm to solve the data packet "clogging" problem within a shared packet pipe without sacrificing bandwidth. Data packets originate from several types of sources. For example, data packets can originate from cellular phone, pagers and other wireless devices. These packets are being transmitted from user to user, i.e. from one cellular caller to another cellular caller; from a caller to a pager, or from a user downloading information from another source. Clogging occurs when too many data packets having multiple priorities are transmitted too close in time. The algorithm transfers a "kill sequence" to prematurely end the transmission of the non-time critical data packet The remainder of the packet will be put back on the queue to be transmitted at the appropriate time. The receiving end of the shared packet pipe 58 will temporarily bold the data received from the non-time critical packet and will append the rest of the packet data once the balance of the time critical data packet is transmitted. A flag in the packet header is used to identify this pending packet to allow for multiple time critical packets to pass through. Expiration timers are used to flush the buffered packet in case of corruption of the line.

Figure 1:
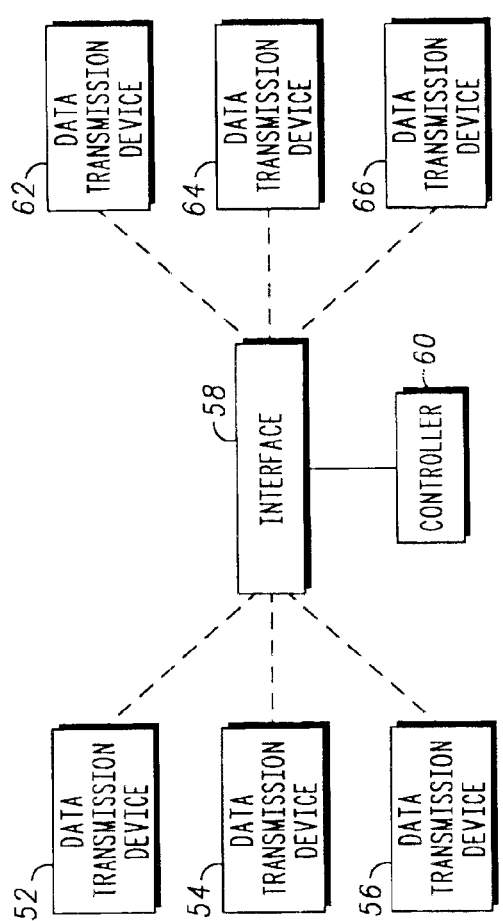
FIG. 1 is a block diagram illustrating a data packet transmission system.
Figure 2:
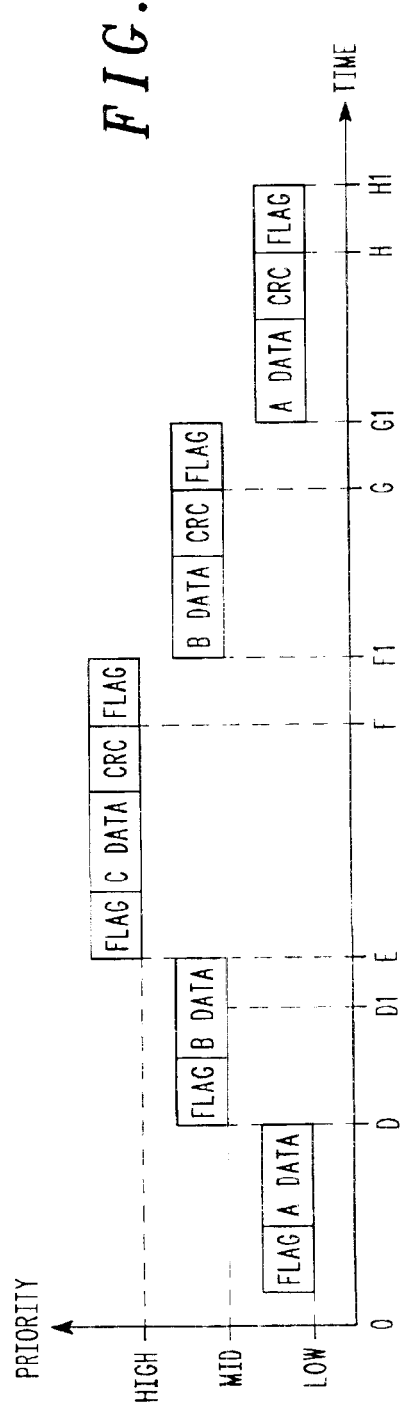
FIG. 2 is a packet transition diagram illustrating a packet prioritization and transmission algorithm in accordance with the present invention.
Figure 3:
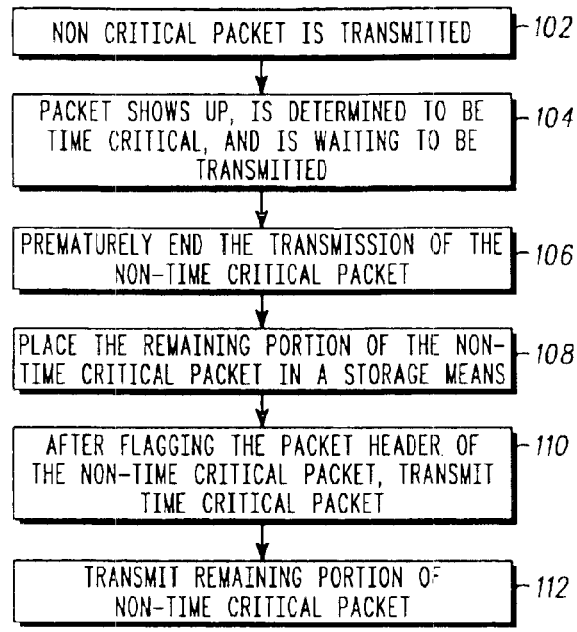
FIG. 3 is a data packet transmission flow chart diagram illustrating one embodiment of a packet prioritization and transmission algorithm in accordance with the present invention.

In accordance with preferred embodiments of the present invention, and with reference to FIG. 1, FIG. 2 and FIG. 3, a packet prioritization and transmission algorithm is disclosed. As described above, FIG. 1 is a block diagram illustrating a data packet transmission system 50. The data packet transmission system 50 includes data packet transmission devices 52–56, a shared packet pipe 58, a data packet transmission controller 60, and data packet receiving devices 62–66. As previously mentioned, data packet transmission devices 52–56 can be, but are not limited to, cellular phones, pagers, and digital personal assistants. Additionally, the data packet receiving devices 62–66 packet can be the same types of devices as the data packet transmission devices 52–56. The shared packet pipe 58 is a data packet transmission medium in which packets are transported to their respective destinations. The data packet transmission controller 60, hereinafter controller 68 regulates the flow of data packets through the shared packet pipe 58. The controller 68 houses and runs the packet prioritization and transmission algorithm in accordance with the present invention.

As described above, FIG. 2 is a packet transition diagram illustrating a packet prioritization and transmission algorithm in accordance with the present invention. The packet prioritization and transmission algorithm (hereinafter "algorithm") can best be explained by applying different scenarios to FIG. 2.

Scenario 1: 2 Levels of Interrupting Packets

Initially, a data packet A and an accompanying flag is sent from a data packet transmission device. At time D, packet B is transmitted. Additionally, at time E packet C is transmitted. The data packet and flag travels in time until it reaches point D, an arbitrary point in time. At the same time data packet A is sent, data packets B and C are also being transmitted. It should be noted however that data packets A, B and C have different transmission priorities in increasing order respectively. At point D, a flag is detected by the algorithm, so the algorithm checks the cyclic redundancy code (hereinafter referred to as CRC) on data packet A just before data packet A reaches point D. The CRC check will fail since data packet A is not finished transmitting. Because the CRC check fails, the algorithm assumes that a higher priority packet (data packet B) is being transmitted. At point E, a flag is received, so the algorithm checks the CRC on data packet B just before data packet D reaches point D1. The CRC check will fail since data packet B is not finished transmitting. Since the CRC check fails, the algorithm assumes that a higher priority packet (data packet C) is being transmitted. At point F, the CRC check is successful, therefore data packet C has been completely transmitted. At point G, two CRC checks are performed. Two checks are performed because it is possible to string data packets together with a flag between each data packet serving as both the end flag of the previous packet and the start flag of the next packet. The receiver does not know if the data packet from point F1 to point G is a second interrupting packet following data packet C or a continuation of data packet B. Thus, the algorithm performs a CRC check on the data packet from point F1 to point G. If the CRC matches, then it is a second data packet following data packet C. Alternatively, the algorithm could perform a CRC check on the data packets after the flag at point D and continue the CRC check through point G (not including the CRC) and exclude the data packet from point E to point F1. If the CRC at point G checks, then packet B is good. At point H the algorithm performs the same function as performed at point G. If the CRC at point H checks, the data packet A is decoded.

Scenario 2: 2 Levels of Interruption with Bit Error (Refer to FIG. 2)

For the purposes of this scenario, assume the bit stream is corrupted a point D1. A bit error on any level corrupts that packet plus all pending packets under it. Since it is assumed that this occurrence is rare, it is deemed acceptable since the packet in transmission would be lost anyway. This method does permit underlying packets to be lost in addition, but by definition, these were not high priority anyway. At point D, a flag is received, so the algorithm checks the CRC on data packet A just before data packet A reaches point D. The CRC check will fail since data packet A is not finished transmitting. Since the CRC check fails, the algorithm assumes that a higher priority packet (data packet B) is being transmitted. At point E, a flag is received, so the algorithm checks the CRC on data packet B just before data packet B reaches point D1. The CRC check will fail since data packet B is not finished transmitting. Since the CRC check fails, the algorithm assumes that a higher priority packet (data packet C) is being transmitted. At point F, the CRC check is successful, therefore data packet C is has been completely transmitted. At point G, the CRC checks fails. The algorithm then assumes the remainder of data packet A is a new data packet, which is incorrect. After the flag at H, if an idle pattern is detected by the algorithm, the algorithm functions in one of two ways: (1) the packet stack is deleted and data packets A and B are lost, or (2) if another data packet follows at point H, the algorithm waits for a timeout on packet A followed by packet B. In either case, data packets A and B are lost.

Scenario 3: Synchronizing Receiver Upon Startup, No Bit Errors (Refer to FIG. 2)

For the purposes of the third scenario assume that a receiver re-boots and comes up at point D1. At point E, receiver gets the first flag. The algorithm discards the data packets present up to point E. At point F1, the algorithm decodes the CRC for data packet C because there is no interrupting higher priority packet being transmitted. At point G1, the algorithm checks the CRC for data packets present between point F1 and point G. The CRC check between these points fails. The receiver assumes that the data packet from point F1 to point G1 is an interrupting packet, which is incorrect. At point H1, receiver checks the CRC and it too fails. Eventually, timers started at points F and G will timeout and their partial packets will be discarded and the receiver will operate normally. Upon synchronization, the algorithm discards packets until all partial packets are purged out of the link. Alternatively, the algorithm could be programmed to wait until the shared packet pipe 58 is clear. This, however, would result in lost data packets.

FIG. 3 shows a data packet transmission flow chart diagram illustrating one embodiment of a packet data transmission algorithm in accordance with a preferred embodiment of the present invention. FIG. 3 provides further detail on how the packet prioritization and transmission algorithm 100 solves the problem of delaying transmission of a lower priority data packet while a higher priority data packet is being transmitted. The process beings with step 102 where a data packet is transmitted. At step 104, a second data packet having the high priority begins to be transmitted. For the purpose of this example, assume the second data packet has a higher priority than that of the data packet having the low priority. Once it is determined that the second data packet has a higher priority than the first data packet, the first data packet is prematurely ended. The remaining portion of the first data packet is then stored. This portion of the process is illustrated in steps 106 and 108 of FIG. 3. After the packet header is flagged, the higher priority data packet is transmitted. This is shown in step 110 of FIG. 3. Once the second data packet is transmitted, the remainder of the first data packet is transmitted to a signal recovery device in step 112.

Figure 4:
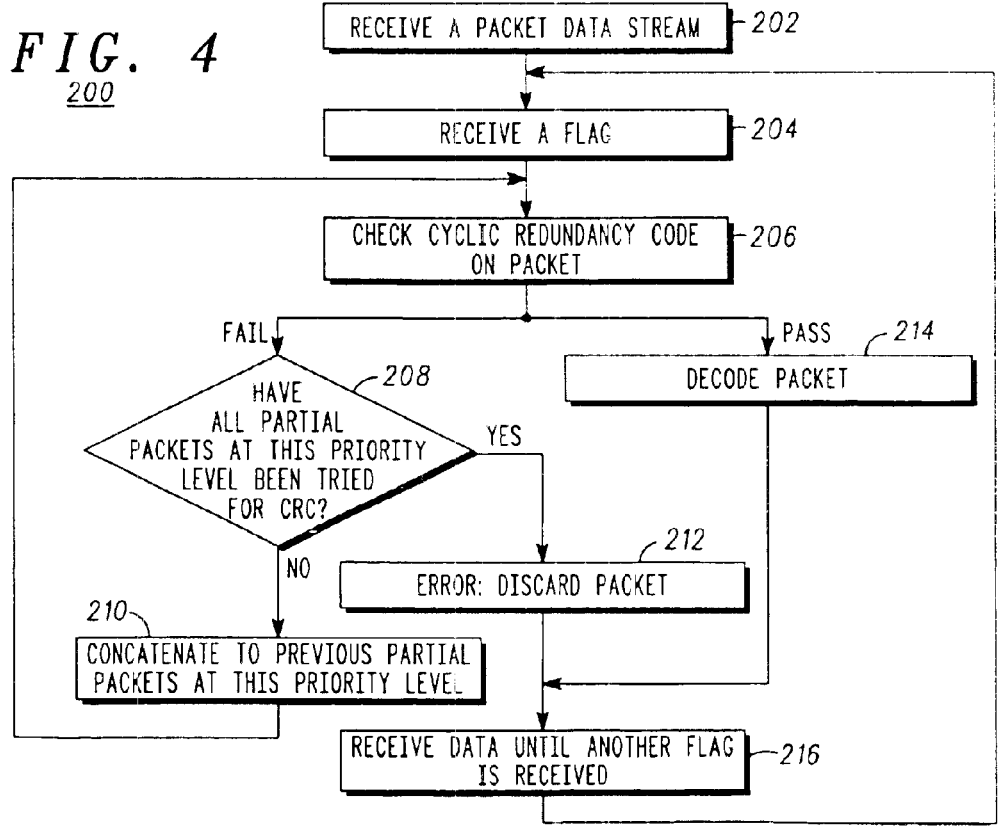
FIG. 4 is a data packet reception flow chart diagram illustrating another embodiment of a packet prioritization and transmission algorithm in accordance with the present invention.

FIG. 4 shows a data packet reception flow chart diagram illustrating another embodiment of the packet prioritization and transmission algorithm 200 in accordance with a preferred embodiment of the present invention. The packet prioritization and transmission process begins with step 202 where a packet data stream is being received. At step 204, a flag is received by the controller 60 indicating either the end of a data packet or the beginning of a data packet. After the flag is received by the controller 60, a cycle redundancy code check is performed on the data packet (step 206). The cyclic redundancy code check determines whether the packet being transmitted is a complete data packet or is a portion of a data packet. If the data packet fails the cycle redundancy check, then the algorithm is programmed to check the CRC for all partial packets with the same priority level as the data packet being transmitted. (step 208). If there are data packets at the same priority level that have not undergone the CRC check, then the algorithm is programmed to concatenate to previous partial packets at this priority level (step 210). After step 210 is completed, the algorithm is programmed to check the CRC on the data packet. Effectively, the algorithm returns back to step 206. If all of the partial packets at this priority level have undergone a CRC check, then there is an error and the algorithm is programmed to discard the data packet currently being transmitted (step 212). If the data packet passes the cycle redundancy code check, then the algorithm decodes the data packet (step 214). At step 216, the higher priority data packet is being received until another flag is received (step 204). The above-described process continues until all of the data kg packets have been transmitted and received.

Although the present invention has been described with reference to preferred embodiments, workers skilled in the art will recognize that changes may be in form and detail without departing from the spirit and scope of the invention.

What is claimed is:

1. In a network utilizing a shared packet pipe to transport a plurality of types of packets each having a different priority, a method for appending multiple packets in a shared packet pipe, the method comprising the steps of:
   flagging a packet header of packet having a low priority to identify pending packets to allow for transmission of packets having a high priority;
   prematurely ending the transmission of a packet having the low priority;
   placing the remainder of the packet having the low priority in a storage device;
   transmitting a packet having the high priority; and
   transmitting the remainder of the packet having the low priority once the packet having the high priority is finished transmitting, wherein the step of flagging, the packet header further comprises the step of determining the priority of an incoming packet and wherein the step of determining the priority of an incoming packet further comprises checking a CRC on the packet having a low priority.

2. The method of claim 1, wherein the step of prematurely ending the transmission of a packet having a low priority further comprises the step of inserting a packet flag at the place in which the packet is to be divided.

3. The method of claim 1, wherein the step of flagging the packet header further comprises the step of periodically checking the priority of the data packet being transmitted.

4. In a network utilizing a shared packet pipe to transport a plurality of types of packets each having a different priority, a method for appending multiple packets in a shared packet pipe, the method comprising the steps of:
   flagging a packet header of packet having a low priority to identify pending packets to allow for transmission of packets having a high priority;
   prematurely ending the transmission of a packet having the low priority;
   placing the remainder of the packet having the low priority in a storage device;
   transmitting a packet having the high priority; and
   transmitting the remainder of the packet having the low priority once the packet having the high priority is finished transmitting, wherein the step of flagging a packet header further comprises the steps of identifying the packet of a low priority and identifying a beginning of the packet of a high priority and, wherein the step of identifying the packets of a low priority further comprises the step of assuming the priority of the packet based on results from the step of checking the CRC on the packet having the low priority.

5. The method of claim 1, wherein the step of flagging a packet header further comprises the step of identifying an interrupting of the packet of the low priority.

6. The method of claim 1, wherein the step of flagging a packet header further comprises the step of identifying an interrupted packet.

7. The method of claim 1, wherein the step of placing the remainder of the packet having a low priority in a storage device further comprises transferring the remainder of the packet to a queue.

8. In a network designed to transport a plurality of types of packets each having a different priority, an apparatus for appending multiple packet types to effect predictable transmission in a shared packet pipe, the apparatus comprising:
   a shared packet pipe;
   a signal transmission means communicatively coupled to the shared packet pipe,
   a controller connected to the shared packet pipe; and
   a signal receiving means connected to a shared packet pipe, wherein the packet prioritization and transmission algorithm is stored in the controller and is used by the controller to regulate the transmission of packets through the standard packet pipe,
wherein the controller is programmed to insert a packet flag at a place in which the packet is to be divided after prematurely ending the transmission of a packet having a low priority, wherein inserting the packet flag further comprises determining the priority of an incoming packet, and wherein determining the priority of an incoming packet further comprises checking a CRC on the packet having a low priority.

9. The apparatus of claim 8, wherein the controller is programmed to periodically check the priority of the data packet being transmitted after flagging the packet header.

10. The apparatus of claim 8, wherein the controller is programmed to identify the packet of a low priority and to identify a beginning of the packet of a high priority after flagging the packet header.

11. The apparatus of claim 8, wherein the controller is programmed to determine the priority of a high priority packet based on the results of the CRC check on the packet having the low priority.

12. The apparatus of claim 8, wherein the controller is programmed to identify an interrupting of the packet of the low priority after flagging a packet header.

13. The apparatus of claim 8, wherein the controller is programmed to identify the priority of an interrupted packet after flagging a packet header.

14. The apparatus of claim 8, wherein the controller is programmed to check the CRC on the packet having a low priority after determining the priority of an incoming packet.

15. The apparatus of claim 8, wherein the controller is programmed to transfer the remainder of the packet having a low priority to storage device.

* * * * *